United States Patent [19]

Frigo

[11] 4,314,522

[45] Feb. 9, 1982

[54] ACOUSTIC ELECTROPNEUMATIC SIGNAL GENERATOR, PARTICULARLY FOR AUTOMOTIVE VEHICLES

[75] Inventor: Domenico Frigo, Olmo, Italy

[73] Assignee: F.I.A.M.M. S.p.A. Fabbrica Italiana Accumulatori Motocarri Montecchio, Montecchio Maggiore, Italy

[21] Appl. No.: 147,150

[22] Filed: May 6, 1980

Related U.S. Application Data

[63] Continuation of Ser. No. 951,157, Oct. 13, 1978, abandoned.

[30] Foreign Application Priority Data

Oct. 14, 1977 [IT] Italy .................... 22499/77[U]

[51] Int. Cl.$^3$ .................... G10K 9/00; G10K 9/12
[52] U.S. Cl. .................... 116/142 R; 116/142 FP; 340/388
[58] Field of Search ............... 340/391, 404, 405, 406, 340/388; 116/142 R, 142 FP, 142 FL, 59; 151/55, 41.76, 68, 54

[56] References Cited

U.S. PATENT DOCUMENTS

| D. 222,927 | 2/1972 | Fusocho | D10/120 |
|---|---|---|---|
| 1,145,256 | 7/1915 | Mochow et al. | 151/54 |
| 1,225,940 | 5/1917 | Dixon | 116/137 R |
| 1,322,831 | 11/1919 | Seiss | 340/391 |
| 1,433,593 | 10/1922 | Atkocaitis | 116/59 |
| 1,545,182 | 7/1925 | Beck | 151/68 |
| 1,698,804 | 1/1929 | Sparks et al. | D10/120 |
| 2,039,694 | 5/1936 | Voigttander | 116/142 FV |
| 2,039,717 | 5/1936 | Hueber et al. | 340/404 |
| 2,285,304 | 6/1942 | Reck | 340/391 |
| 2,396,423 | 3/1946 | Hines | 340/405 X |
| 2,694,806 | 11/1954 | Johnson | 340/404 |
| 3,060,406 | 10/1962 | Wright | 340/404 X |
| 3,090,349 | 5/1963 | Chow et al. | 116/142 R |
| 3,323,768 | 6/1967 | Hennessey | 151/41.76 |

FOREIGN PATENT DOCUMENTS 407528  3/1934  United Kingdom ............... 340/391

Primary Examiner—Daniel M. Yasich
Attorney, Agent, or Firm—Karl F. Ross

[57] ABSTRACT

A signal generator comprising one or two horns and an electrically operated air compressor is secured to a vehicle body, directly or indirectly, by a screw connection which includes a bolt with a hexagonal head received in a seat on a muff of each horn, the seat being formed by an open-ended channel accommodating the head and an adjacent narrower slot traversed by the shank of the bolt. This bolt may be inserted into a hole in the vehicle body or, in the case of two horns, may engage a strap bolted to that body; alternatively, such a strap with a pair of horns fastened thereto can be bolted to the associated air compressor which for this purpose has two diametrically opposite seats each similar to the one on the horn muff, one of these latter seats serving for the bolting of the compressor to the vehicle body.

7 Claims, 9 Drawing Figures

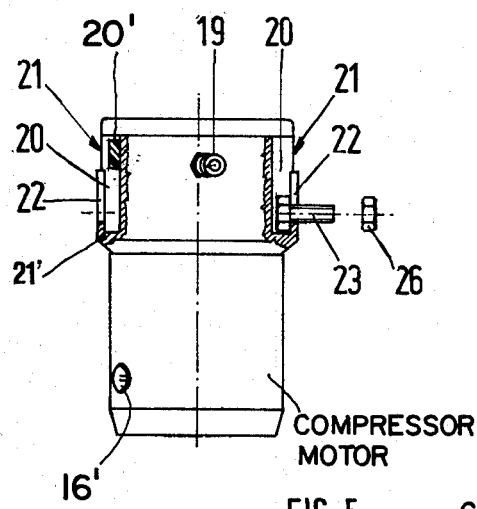
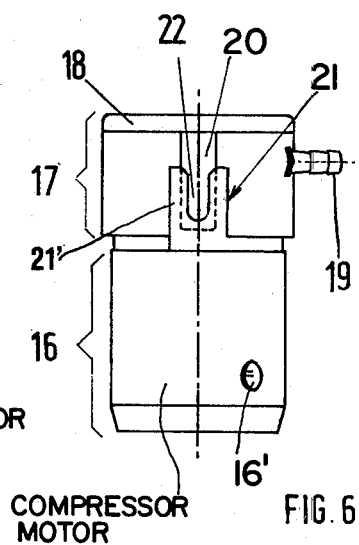
FIG. 5  FIG. 6
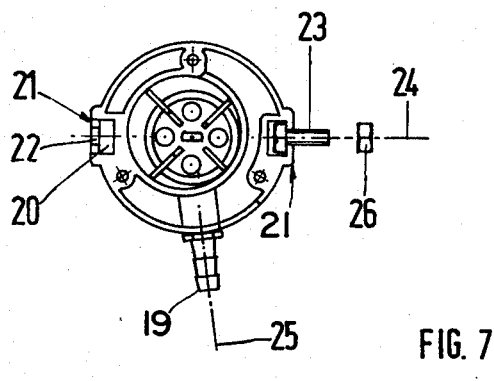
FIG. 7

ACOUSTIC ELECTROPNEUMATIC SIGNAL GENERATOR, PARTICULARLY FOR AUTOMOTIVE VEHICLES

CROSS-REFERENCE TO RELATED APPLICATION

This is a continuation of my copending application Ser. No. 951,157, filed Oct. 13, 1978 and now abandoned.

FIELD OF THE INVENTION

My present invention relates to an improved electropneumatic sound generator of the type used for automotive vehicles.

BACKGROUND OF THE INVENTION

Such acoustic signal generators —constituted by one or more horns and a generally cylindrical electric compressor serving as a source of air under pressure—are conventionally installed on the body of the vehicle by providing the electric compressor during manufacture with a mounting strap or using a collar strap to be applied to the compressor at the installation site; by means of two screws, the strap—and thus the compressor—is fixed to the vehicle body which is suitably perforated. The horns, on the other hand, have a muff provided with a stud, or threaded for receiving a screw, or else they are provided—by soldering—with mounting straps; in any case, however, the horn is directly secured to the vehicle body, thus requiring further apertures in that body.

These solutions present several inconveniences: in particular, they require specific mounting means—such as the straps, the stud, the threading etc.—which must be specifically produced, thus increasing the production costs.

OBJECT OF THE INVENTION

The object of the invention is to provide a signal generator of the type referred to which obviates the aforementioned drawbacks, enabling in addition a maximum simplification of the installation operations and a reduction—as far as possible with reference to the shape of the vehicle—of the perforations of the vehicle body.

SUMMARY OF THE INVENTION

I realize this object, in accordance with a feature of my invention, by providing a horn of an acoustic signal generator with a generally cylindrical muff at an end of a cornet forming part of the horn, the muff being formed between its axis and its peripheral surface with an axially extending open-ended channel and a narrower slot communicating therewith and opening onto the peripheral muff surface. A polygonal—preferably hexagonal—head of a fastening screw is nonrotatably received in this channel, the shank of the screw traversing the slot in order to secure the horn directly or indirectly to a vehicular body.

An indirect connection may include, as part of the fastening means, a strap whose two extremities are connected to substantially identical muffs of a pair of horns by bolts received in the aforedescribed manner in the channels and slots thereof.

Alternatively, a horn may be connected with the vehicular body through the intermediary of an associated electrically driven air compressor having a substantially cylindrical housing with a pair of grooved seats accommodating respective bolts, these seats being each generally similar to the channel-and-slot arrangement described above and accommodating respective bolts engaging the vehicular body and a horn-supporting strap. Thus, another aspect of my invention resides in the provision of a peripheral lodgment on the compressor housing accommodating a fastening bolt, the horn being secured to the housing at a peripheral location remote from this lodgment.

BRIEF DESCRIPTION OF THE DRAWING

These and further features of the invention will become apparent from the following detailed description given with reference to the accompanying drawing in which:

FIG. 5 illustrates, in partly sectional front view, an electrical air compressor of a sound generator embodying my invention;

FIG. 6 illustrates in side view the electrical air compressor shown in FIG. 5;

FIG. 7 illustrates the same compressor in plan view with its cover removed,

SPECIFIC DESCRIPTION

Figure 1:
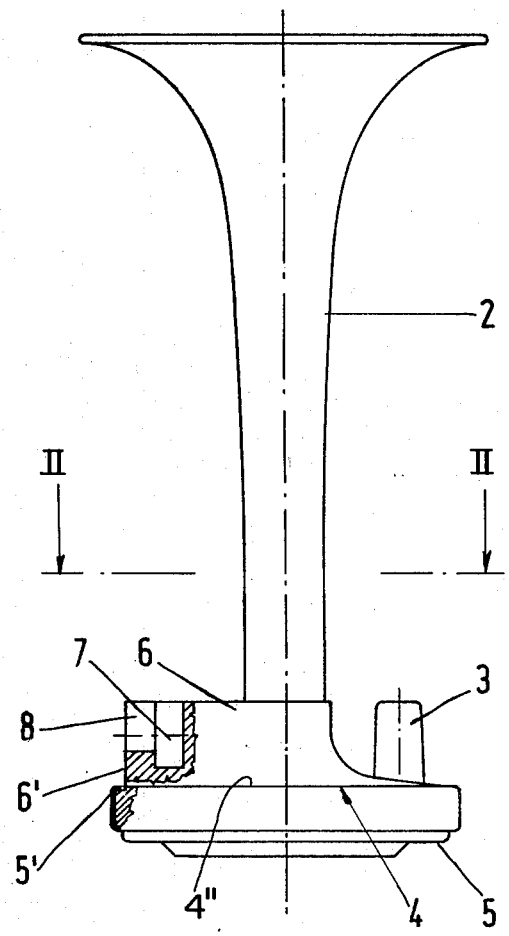
FIG. 1 illustrates, in a partly sectional lateral view, one of the horns of an acoustic signal generator according to the invention.

As shown in the aforementioned drawing, an acoustic electropneumatic signal generator according to the invention comprises one or more horns, of the type illustrated in FIG. 1, associated with a blade-type rotary electrical compressor of the type illustrated in FIGS. 5 and 7.

Each horn (see FIG. 1) includes a cornet 2, rigid and coaxial with a cylindrical muff 4 provided with an air intake 3, and is closed at the bottom by a cover 5 which fixes a membrane 4'(FIG. 2) to the muff, all this corresponding to the conventional horns for electropneumatic signal generators.

The muff 4 is provided—on its end face 4" opposite cover 5 with a mounting 6 in the form of a radially extending boss having an open-ended channel 7 and a slot 8 adjoining same; channel 7 is so shaped and dimensioned as to accommodate the head of a screw or bolt 9 (FIGS. 2 and 3) whereas the adjacent slot 8—of lesser width and depth—gives clearance to the shank of screw 9 which advantageously is of unitary type and has a hexagonal head two of whose sides are in contact with the walls of channel 7 in order to prevent any rotation of the screw in its tightened state.

The mounting 6 has an external face 6' is slightly set back from the peripheral edge 5' of cover 5 adjoining the muff 4, so that this edge is continuous and uniform for a better tensioning of the membrane.

Figure 2:
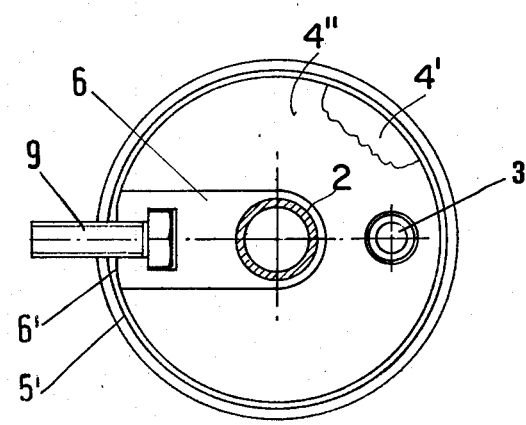
FIG. 2 illustrates the horn of FIG. 1 in cross-sectional view taken on the line II—II of FIG. 1.
Figure 3:
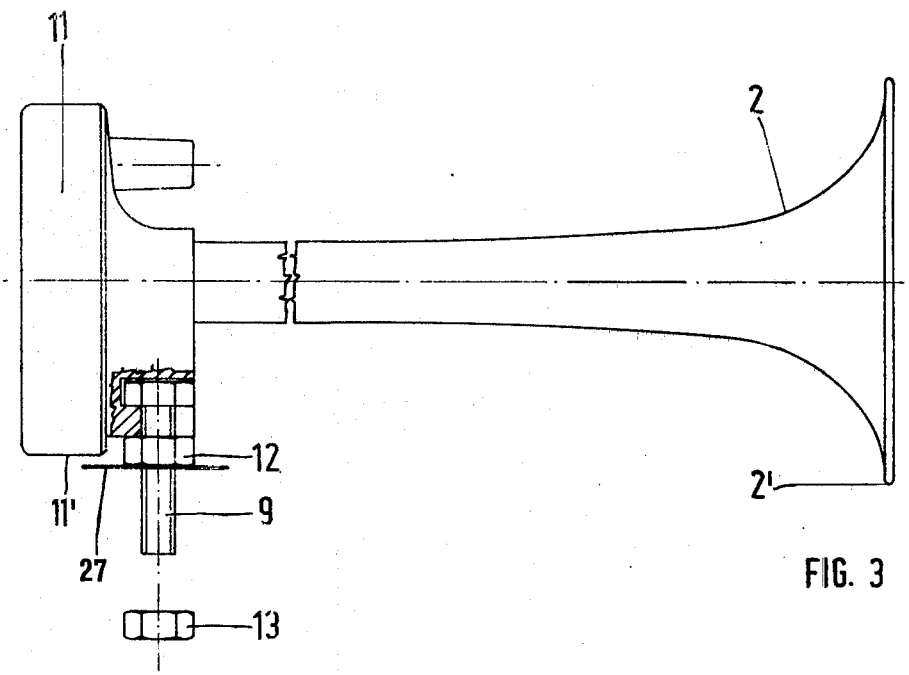
FIG. 3 illustrates, in partly sectional lateral view, the horn of FIG. 1 disposed for direct installation on the body of a vehicle.

In FIG. 3 there is illustrated the horn of FIGS. 1 and 2 directly installed on the body 27 of an automotive vehicle. The screw 9 is inserted in the seat 7, 8 and is locked therein by means of a first nut 12; its shank is received in a hole suitably formed on the vehicle body 27 and is locked there with the aid of a second nut 13. The nut 12, aside from securing the screw 9 to the horn, serves as a spacer between the face 6' of the mounting 6 and the vehicle body 27 to prevent that the rim of an external cover 11—generally provided for a further protection of the membrane—and the rim 2' of the cornet 2 interfere with the vehicle body 27 upon a tightening of the nut 13. This obviates the need for letting the mounting 6 project beyond the outer diameter of the cover 5 and of the external cover 11, which would involve an interruption of the peripheral edge 5' to the detriment of the tensioning of the membrane.

Figure 4:
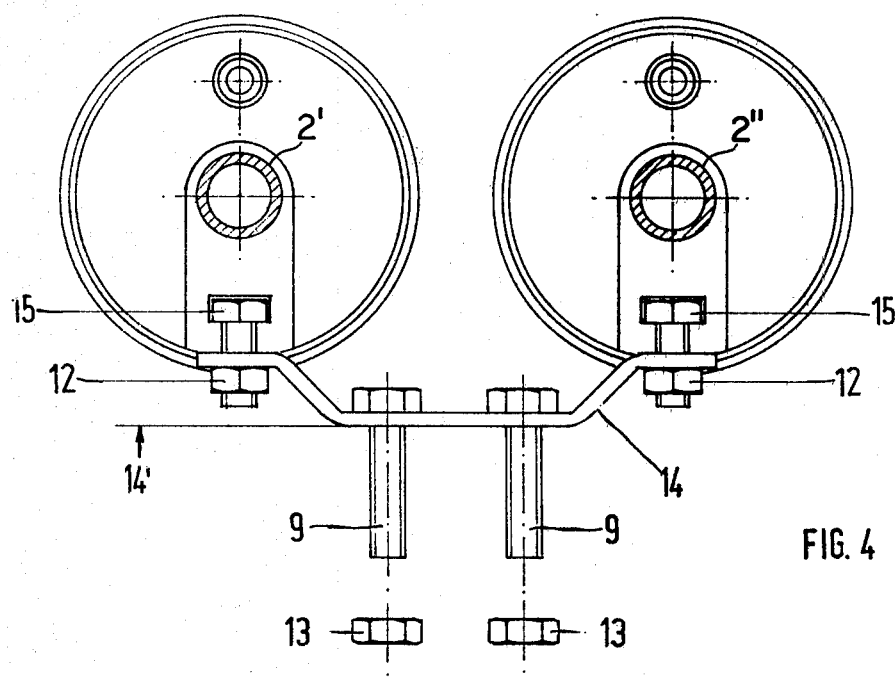
FIG. 4 illustrates, in cross-sectional view similar to FIG. 2, two horns of the type illustrated in FIG. 1, coupled for direct installation on the body of the vehicle.

In FIG. 4 there is illustrated a possible mode of installation of two interconnected horns 2', 2" according to the invention. The two horns are mounted on a strap 14 by means of screws 15 and nuts 12, these screws 15 being of a length substantially less than that of the screws 9 so as not to project, upon installation of the horns, beyond the plane 14' of the strap 14. The two horns thus interconnected are therefore directly secured to the vehicle body by means of the screws 9 and the nuts 13, or else to the electric compressor as will be illustrated hereinafter.

FIGS. 5, 6 and 7 illustrate an electrical air compressor 17 provided with a motor 16 with a cable connector 16', its compressor 17 having a cover 18 and an air-discharge nozzle 19 of a type known per se.

According to the invention, there is cut out on the body of the compressor/motor unit—advantageously on the cylindrical housing of the compressor 17 itself—at least one axially extending groove 20 of a width corresponding to that of the hexagonal head of a bolt or screw 23 and at least double in height; an outer flange 21' of lesser height provided with a narrower gap 22 defines with groove 20 a seat 21 for the nonrotatable confinement of the head of the screw 23 whose shank projects outwardly across gap 22. The insertion of the screw 23 between the flange 21' and the emplaced cover 18 overhanging the groove 20 is made possible by the larger axial height of this groove with respect to that flange; the compressor so positioned is installed on the vehicle body by a tightening of a nut 26 mating with screw 23.

In the portion of groove 20 which remains free above the head of the screw 23, when the same has been installed, there can be inserted a plug 20'—e.g. of thermoplastic material—adapted to prevent the accidental removal of the head of the screw 23 from the seat 21, in the event of an improper tightening of the nut 26.

In the illustrated—particularly advantageous—embodiment I have provided two seats 21 positioned diametrically opposite each other on the compressor housing along a line 24 offset with respect to the axis 25 of the air-discharge nozzle 19; this arrangement enables the convenient application of the electrical compressor to the right-hand or left-hand side of the vehicle, or transversely, and with the nozzle 19 oriented in any direction whatever, according to the most convenient and suitable arrangement to permit a flexible connecting tube 30 (FIG. 9) for supplying compressed air to the horns to be as short as possible and to have as few bends as possible. The presence of a plug 20', however, has been illustrated only for the left-hand seat 21 of FIG. 5.

Figure 8:
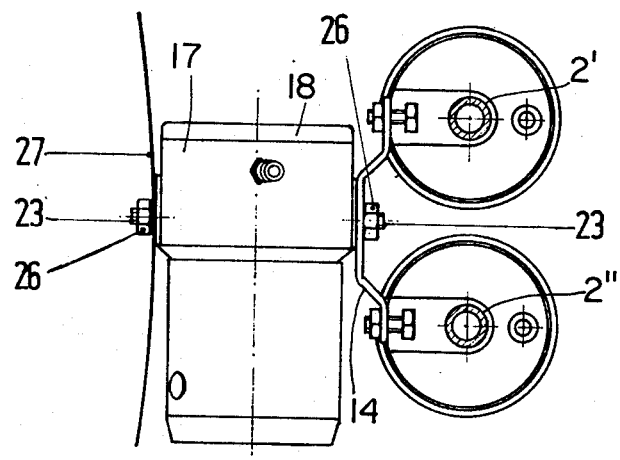
FIG. 8 illustrates an acoustic signal generator according to the invention, provided with two horns, installed on the body of a vehicle.
Figure 9:
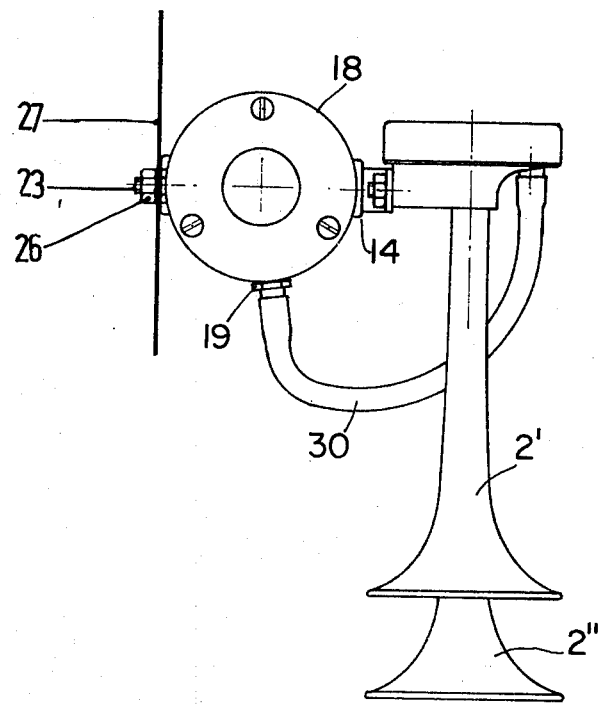
FIG. 9 illustrates the acoustic signal generator of FIG. 8 in plan view.

FIGS. 8 and 9 show how a signal generator according to the invention, with two horns, can be applied to the body 27 of a vehicle by providing same with a single hole; the electrical compressor is installed by means of one screw 23 and nut 26, engaged in one of the seats 21, there being mounted on the opposite seat—via another screw 23 and nut 26—the strap 14 carrying the two horns as illustrated in FIG. 4.

It will thus be seen that my improved signal generator offers great flexibility of installation.

I claim:

1. In combination, an acoustic signal generator for an automotive vehicle, comprising two horns each provided with a cornet and a generally cylindrical muff enclosing a membrane and having an end face joined to said cornet, and fastening means for securing said signal generator to a vehicle body, the muff of each horn carrying on said end face a radially extending boss which supports said cornet in coaxial relationship with said muff and is provided between the peripheral surface and the axis of said muff with an open-ended channel parallel to said axis and a narrower slot transversely communicating with said channel while opening onto said peripheral surface, said fastening means including a strap with a pair of extremities each connected to the muff of a respective horn by a removable screw with a polygonal head nonrotatably confined between walls of said channel and with a shank radially traversing said slot.

2. The combination defined in claim 1 wherein said slot opens onto an end of said boss set back from said peripheral surface.

3. The combination defined in claim 1 or 2 wherein said signal generator further comprises an electrically driven compressor with an outlet connected to an inlet of each muff for supplying said horns with air under pressure, said compressor having a substantially cylindrical housing with a pair of grooved seats accommodating respective bolts, one of said bolts engaging said strap midway between said extremities thereof, the other of said bolts being engageable with said vehicle body.

4. The combination defined in claim 3 wherein said seats form axially extending grooves with walls nonrotatably confining polygonal heads of said bolts therebetween, said grooves being overlain by flanges forming gaps of lesser width in line therewith, said bolts having shanks traversing said gaps.

5. The combination defined in claim 4 wherein said housing has a cover overhanging said grooves, said flanges terminating sufficiently short of said cover to facilitate the insertion of the heads of said bolts.

6. The combination defined in claim 5, further comprising plugs inserted in said grooves between said cover and said heads of said bolts to prevent untimely detachment of the latter from said housing.

7. The combination defined in claim 2, further comprising a nut on said shank contacting said end of said boss and projecting beyond said peripheral surface.

8. In combination, an acoustic signal generator for an automotive vehicle, comprising at least one horn and an electrically driven compressor for supplying air under pressure to said horn, hose means extending from an outlet of said compressor to an inlet of said horn, and fastening means for securing said signal generator to a vehicle body, said compressor having a substantially cylindrical housing with two substantially identical seats at diametrically opposite locations thereof, said fastening means including a first bolt having one portion nonrotatably received in one of said seats with another portion mounted on the vehicle body and a second bolt received in the other of said seats, said compressor being connected to said horn through the intermediary of said second bolt.

9. The combination defined in claim 8 wherein each of said seats forms an axially extending groove with walls nonrotatably confining a polygonal head of the respective bolt therebetween, said groove being overlain by a flange forming a gap of lesser width in line therewith, said respective bolt having a shank traversing said gap.

* * * * *